(12) United States Patent
Touchard et al.

(10) Patent No.: US 8,014,350 B2
(45) Date of Patent: Sep. 6, 2011

(54) METHOD AND EQUIPMENT FOR DATA TRANSMISSION BY AD-HOC NETWORK

(75) Inventors: Nicolas P. Touchard, Suresnes (FR); Eric Masera, Paris (FR); Thierry Lebihen, Bourg la Reine (FR); Santie V. Adelbert, Vincennes (FR)

(73) Assignee: Eastman Kodak Company, Rochester, NY (US)

( * ) Notice: Subject to any disclaimer, the term of this patent is extended or adjusted under 35 U.S.C. 154(b) by 889 days.

(21) Appl. No.: 11/816,415

(22) PCT Filed: Feb. 21, 2006

(86) PCT No.: PCT/EP2006/001530
§ 371 (c)(1),
(2), (4) Date: Jan. 31, 2008

(87) PCT Pub. No.: WO2006/097177
PCT Pub. Date: Sep. 21, 2006

(65) Prior Publication Data
US 2008/0192672 A1     Aug. 14, 2008

(30) Foreign Application Priority Data
Mar. 16, 2005    (FR) ...................................... 05 02567

(51) Int. Cl.
*H04W 4/00*    (2009.01)
(52) U.S. Cl. ....................................... 370/329; 370/338
(58) Field of Classification Search .................. 370/315, 370/328, 329, 338
See application file for complete search history.

(56) References Cited

U.S. PATENT DOCUMENTS

| | | | |
|---|---|---|---|
| 5,943,322 A | 8/1999 | Mayor et al. | 370/280 |
| 6,954,435 B2 * | 10/2005 | Billhartz et al. | 370/252 |
| 7,142,524 B2 | 11/2006 | Stanforth et al. | 370/328 |
| 2003/0024799 A1 | 2/2003 | Jorgensen et al. | 455/450 |
| 2004/0085909 A1 | 5/2004 | Soliman | 370/252 |
| 2005/0129000 A1 * | 6/2005 | Sivakumar et al. | 370/351 |
| 2009/0122748 A1 * | 5/2009 | Gourhant et al. | 370/328 |

FOREIGN PATENT DOCUMENTS
WO   WO 03/090365 A2   10/2003
WO   WO 2004/043088 A2   5/2004

* cited by examiner

*Primary Examiner* — Jung Park
(74) *Attorney, Agent, or Firm* — Kevin E. Spaulding

(57) ABSTRACT

The invention relates to a method of data transmission by an ad-hoc network of mobile communication equipment (16*a*, 16*b*, 16*c*, 16*d*), from at least one source equipment (12) to at least one collection terminal (14), by means of mobile relay equipment (16*c*), in which for each communication equipment, at least one quality factor is updated (Q0, Q1, Q2 Q3, Q4, Q5). According to the invention, the quality factor of each relay equipment depends on a history of data transmission, and data transmission from mobile equipment to mobile relay equipment is conditional on the quality factor of the relay equipment capable of receiving the data.

13 Claims, 3 Drawing Sheets

METHOD AND EQUIPMENT FOR DATA TRANSMISSION BY AD-HOC NETWORK

FIELD OF THE INVENTION

The present invention relates to data transmission, and in particular image data, by means of an ad-hoc communication network.

An "ad-hoc network" means a wireless communication network that uses a number of mobile communication equipments as information vectors. Unlike distributed communication networks (with infrastructure base), such as mobile or fixed phone networks or the Internet, the configuration of the ad-hoc network has a short-lived and changeable character inherent to the mobility of the equipment comprising it.

The invention has applications in data transport, and especially large volumes of data, such as image data. The transport takes place between an individual user and an access point to a service or an access point to a distributed network such as the Internet.

BACKGROUND OF THE INVENTION

A lot of mobile equipment, such as mobile phones, organizers or cameras, is provided with several communication channels. A first radio communication channel enables equipment to exchange data with access terminals to distributed networks such as the telephone network or Internet. Access to these networks is controlled by a number of telephone operators which users can subscribe to. This first communication channel provides mobile equipment with the option of communicating easily and quickly with other equipment located a significant distance away. On the other hand, the radio bandwidth is not favorable to the transmission of large volumes of data. The user finds, for example, that the transmission of image files by this channel requires relatively long communication times. Thus, given the subscription rates, the transmission of image files becomes expensive.

A second radio or infrared communication channel can be used locally for data exchanges between devices that are geographically near and share the same communication protocol (Bluetooth, Wi-Fi). The field of coverage of this communication channel has a range limited from 20 to 100 meters. The limited range of the communications however is compensated for by a broad bandwidth and almost free exchanges. The bandwidth from about some hundreds of kbps to some dozens of Mbps enables the transmission of large volumes of data in very short times. The arrival of the Ultra Wide Band (UWB) standard will further increase this bandwidth for short-range transfers.

When the density of the mobile communication equipment in a geographic zone is high, information can flow by multiple hops between equipment from the source equipment towards the target equipment. Various information paths or routes can be proposed in certain cases.

On the contrary, in the absence of any equipment that can act as relay in a given zone, the information to transmit is stored in a memory of the source equipment or the intermediate equipment having the information, until the time when equipment capable of continuing the information transmission is identified. Thus the information flows not only by hops between equipment, but also by using the physical movement of the users of the mobile equipment.

The state of the art is illustrated by documents (1) to (7), whose full references are given at the end of the present description.

SUMMARY OF THE INVENTION

The invention starts from the observation of a number of difficulties capable of arising during the transmission of image data, and in particular games with large volumes of data, by means of an ad-hoc network.

In a geographic zone covering a lot of equipment capable of communicating according to a short-range exchange protocol, there appears in particular the risk of a profusion of data exchanged and stored in the memories of the equipment. The data are temporarily stored in the memory of each receiving equipment. Indeed saving is necessary not only for the physical transport of data, but also to prevent reception of the same data several times. The profusion, which could occur in a place frequented by the public, such as a large transport interchange, could quickly lead to the saturation of the memory capacity of the mobile equipment present. The propagation of data from source equipment to target equipment then rapidly becomes impossible because of a chaotic multiplication of data at each hop to other equipment.

A converse difficulty occurs when a very little communication equipment is present in a given environment. In this case, because of the relatively low probability of finding relay equipment, the data are mainly conveyed by means of the physical movement of the users of mobile equipment.

In special situations where the movements of users are absolutely predictable, the probability that the information reaches its goal is high. For example, vehicles driving on a road have high chances of coming across a data collection terminal located on the roadside. However, in most cases, the routing of the data by their physical transport in the memory of equipment is very unpredictable.

Technical difficulties, as well as privacy requirements, forbid the knowledge or use of the knowledge of the routes of the users of mobile equipment.

The object of the present invention is to overcome the above-mentioned difficulties and propose an ad-hoc network transfer method suited to the exchange of high digital weight data.

An object in particular is to optimize the routing of data from source equipment to a collection terminal, by taking into account not only equipment-to-equipment data transmission, but also their transport by the users' physical movement.

Another object is to prevent clogging of the ad-hoc network by the profusion of transmitted data.

To achieve these objects, the invention has more precisely for object a method of data transmission by an ad-hoc network of mobile communication equipment, from at least one source equipment to at least one collection terminal, by means of mobile relay equipment, in which for each communication equipment, at least one quality factor is updated. According to the invention, the quality factor of each relay equipment is determined as a function of a history of data transmission by the equipment. Further, data transmission from mobile equipment to mobile relay equipment is conditional on the quality factor of the relay equipment liable to receive the data.

Although a single quality factor enables implementation of the method, various quality factors can be used respectively for various types of data and/or for routing data to various types of collection terminals.

"Source equipment" means equipment that transmits data to a collection terminal. As soon as data is received by relay equipment, communicating according to a common protocol with the source equipment, the relay equipment can in turn become the source equipment to propagate the data.

"Collection terminal" means the terminal to which the data are destined. This can be a collection terminal, a computer, or even mobile equipment, of the same type as the relay equipment, but which is the final destination of the data. The collection terminal is considered the final destination of the data when the data does not have to be retransmitted to the ad-hoc network. This does not however exclude the later transmission of the data to other equipment by a distributed communication network such as the Internet.

Thanks to the invention, data transmission depends on the quality factor of the relay equipment capable of receiving the data. This enables the uncontrolled multiplication of the number of hops to be prevented, i.e. the number of equipments in which data are received and stored. Further, as the quality factor is updated according to a transmission history, it is possible to favor the transfer of data to relay equipment that has a good history, i.e. equipment that in the past favored the routing of data to a collection terminal.

As will appear below in the description, updating the quality factor does not require the transmission of a control signal from the collection terminal to the source equipment and does not require knowledge of the movement habits of the users of the mobile equipment. The method thus prevents any breach of the users' privacy.

According to one implementation option of the method, the quality factor of each mobile equipment of an ad-hoc network is respectively updated during each transmission and each reception of data.

For example, the quality factor can be increased during the transfer of data to at least one from among other mobile equipment and a collection terminal, and decreased during a reception of data from other mobile equipment.

This means that equipment that receives a lot of data and re-transmits little of it, finds its quality factor decreasing. Thus it becomes a less favorable candidate for routing data and becomes less likely to be selected as relay equipment. Conversely, equipment that efficiently re-transmits data to other relay equipment, or to a collection terminal, finds its quality factor increasing. A balance is created insofar as the quality factor stops increasing when the equipment reaches its maximum capacity to transmit the received data.

The mobile equipment of a user who frequently passes near a collection terminal may of course have a high quality factor. However, this factor decreases along with the reception of new data to be transferred.

According to another option, the quality factor can be increased during a transfer of data received from other mobile equipment, and can be decreased in the absence of the transfer of received data to at least one from among other mobile equipment and a collection terminal, at the end of a preset saving period.

In this case, the quality factor also decreases according to time. For example, if the battery of the local equipment is too weak to transmit the stored data, the saving period comes at its end and the quality factor decreases.

According to one improvement, it is possible to increase, respectively decrease, the quality factor during the transfer of data to other mobile equipment, by an amount that is an increasing function of the quality factor of said other mobile equipment.

In other words, given mobile equipment finds its own quality factor increasing, when it transmits data to other mobile equipment of higher quality factor, i.e. to equipment that offers better chances of routing data to a collection terminal. Conversely, it finds its own quality factor decreasing, when it transmits data to other mobile equipment with lower quality factor.

The treatment of mobile equipments and collection terminals can be performed in a comparable way, by assigning, for example, the maximum quality factor to the collection terminals. Any equipment capable of transferring data to a distributed network, such as the Internet, is comparable to a collection terminal. However, there is the option of assigning a higher quality factor to a dedicated collection terminal such as a downloading terminal, an occasional collection terminal, or a personal computer.

By taking into account the quality factor of equipment receiving information, it is possible to refine the transmission history to favor a high transmission probability. A simple illustration can be given. The mobile equipment of a first user who almost never passes near a collection terminal on their usual track would in principle have a very low quality factor, and would be considered a poor choice for relaying data. On the other hand, it is possible that the same user every day, or several times a day, comes across a second user who regularly passes near a collection terminal. In this case, and despite the fact that the first user has no direct access to a collection terminal, they constitute an excellent relay for routing data. The routing is performed simply with one "hop", i.e. with one additional transmission. Taking into account the quality factor of the second user, which is high, to increase that of the first user, allows for the fact that the first user's equipment can frequently transmit data to equipment, which constitutes an excellent relay to a collection station.

The quality factors can be expressed as a percentage where the 100% value corresponds to certain transmission to a collection terminal. This is the case of downloading terminals.

According to one implementation option of the invention, the quality factor Q can thus have the following form:

$$Q = \frac{<Q_i>}{N}$$

In this expression $Q_i$ is the quality factor of receiving mobile equipment i to which the data are transferred, N is a value incremented at each reception of data to transfer from transmitting mobile equipment. The arithmetic mean of the $Q_i$ values is calculated along with the sending of data to receiving equipment.

In this case, also, the value of $Q_i$ used for updating the quality factor during a transfer to a collection terminal is preferably the maximum value.

As mentioned above, it is necessary to control the distribution of data among the various equipment of the ad-hoc network to prevent a profusion of data. Indeed, profusion would result in the saturation of the memories of the equipment. Profusion is reduced by the fact that sending data depends on the quality factor. Two other measures are also envisaged to avoid profusion. The first consists in limiting the number of successive data hops, i.e. the number of successive transfers of data between various mobile equipment.

Thus, according to one aspect of the invention, each data to be transferred from source equipment to a collection terminal can be associated with a number of hops, corresponding to a maximum number of successive transfers of data between mobile relay equipment. The number of hops can be fixed in particular according to the quality factor of the source equipment, i.e. of the equipment that creates the data.

If the quality factor of the source equipment is high, this means that the probability is high that the source equipment can transfer the data to a collection terminal with a reduced number of hops. Therefore, it is not necessary to plan a large number of hops. Conversely, if the quality factor of the source equipment is low, the probability of direct, even indirect, transfer of data to a collection terminal remains low. Then it is advisable to permit a larger number of hops.

Practically, it is possible to fix the number of hops according to the quality factor of the source equipment from which the data is transmitted for the first time, and in which the number of hops is decreased by 1 at each transmission to new mobile relay equipment.

According to one implementation option of the invention, the source equipment can perform one or several searches for mobile relay equipment and collection terminals in a field of local radio coverage, and collect the quality factor of mobile equipment capable of satisfying the search. In the absence of collection terminals, the data are transferred to one or several relay equipments in decreasing order of the quality factors of the equipment having responded to the search.

According to another option, still in the absence of collection terminals, the data are transferred to at least one relay equipment having a higher quality factor to at least one from among a threshold quality factor, and the quality factor of the source equipment.

The threshold quality factor in particular avoids the sending of data to mobile equipment whose probability of routing the data is too low.

In the absence of a response or of a sufficient number of responses when searching for relay equipment, the data are not transmitted. A new search for relay equipment can be later made. In this case, during the new search, the threshold quality factor necessary to start the transfer is lowered. In other words, the requirement relative to the quality factor decreases with each new fruitless search for mobile relay equipment.

A second solution to avoid data profusion consists, for a given hop, in limiting the number of mobile equipments to which transmitter equipment can transfer the data.

Thus, in the case of a plurality of relay equipments responding, the data are transferred to a number E of relay equipments according to the quality factors of the equipment having responded. If the equipment having responded has on average high quality factors, only a small number E of relay equipments will be selected. For example, the equipment having the highest quality factors. On the other hand, if the average of the quality factors of equipment having responded is rather low, a higher number of relay equipments E is selected. The choice will still be made preferentially for equipment having the highest quality factor.

It is possible in particular to associate each data to be transferred from source equipment to a collection terminal with a number of hops H, corresponding to a maximum number of successive transfers of data between mobile relay equipment. For example, the number of hops H can be fixed according to the quality factor of the source equipment from which data is first transmitted and decreased by one at each hop. The following relation $E^H = k$ can also be verified, where k is a preset constant, and E is the maximum number of relay equipments to which the data are transferred to at each hop. Therefore data that is transmitted to a large number of relay equipments can only take a low number of hops, and reciprocally. When the number of hops assigned to data is reached, the data is no longer transmitted to the relay equipment. It can be destroyed, either at once or after a set conservation time. The option of transmitting to a collection terminal is preferably maintained during the conservation period of the data in relay equipment.

In view of implementing a process such as described, the invention also relates to mobile communication equipment capable of receiving and transmitting data in an ad-hoc communication network, having a conservation memory with at least one quality factor, and means of updating the quality factor in response to each data reception and transmission by the mobile equipment.

The equipment can be also provided with means to collect the value of the quality factor of other peer equipment in communication with the mobile equipment. In this case, the updating means are capable of modifying the quality factor according to the quality factor of other peer equipment.

The equipment can also comprise a transmitter of data to peer equipment, the transmitter being controlled by the means to collect the quality factor of the other peer equipment, to select data destination equipment from among this equipment.

Other characteristics and advantages of the invention will appear in the following description, with reference to the figures in the appended drawings. This description is given purely as an illustration and is not limiting.

DETAILED DESCRIPTION OF THE INVENTION

Figure 1:
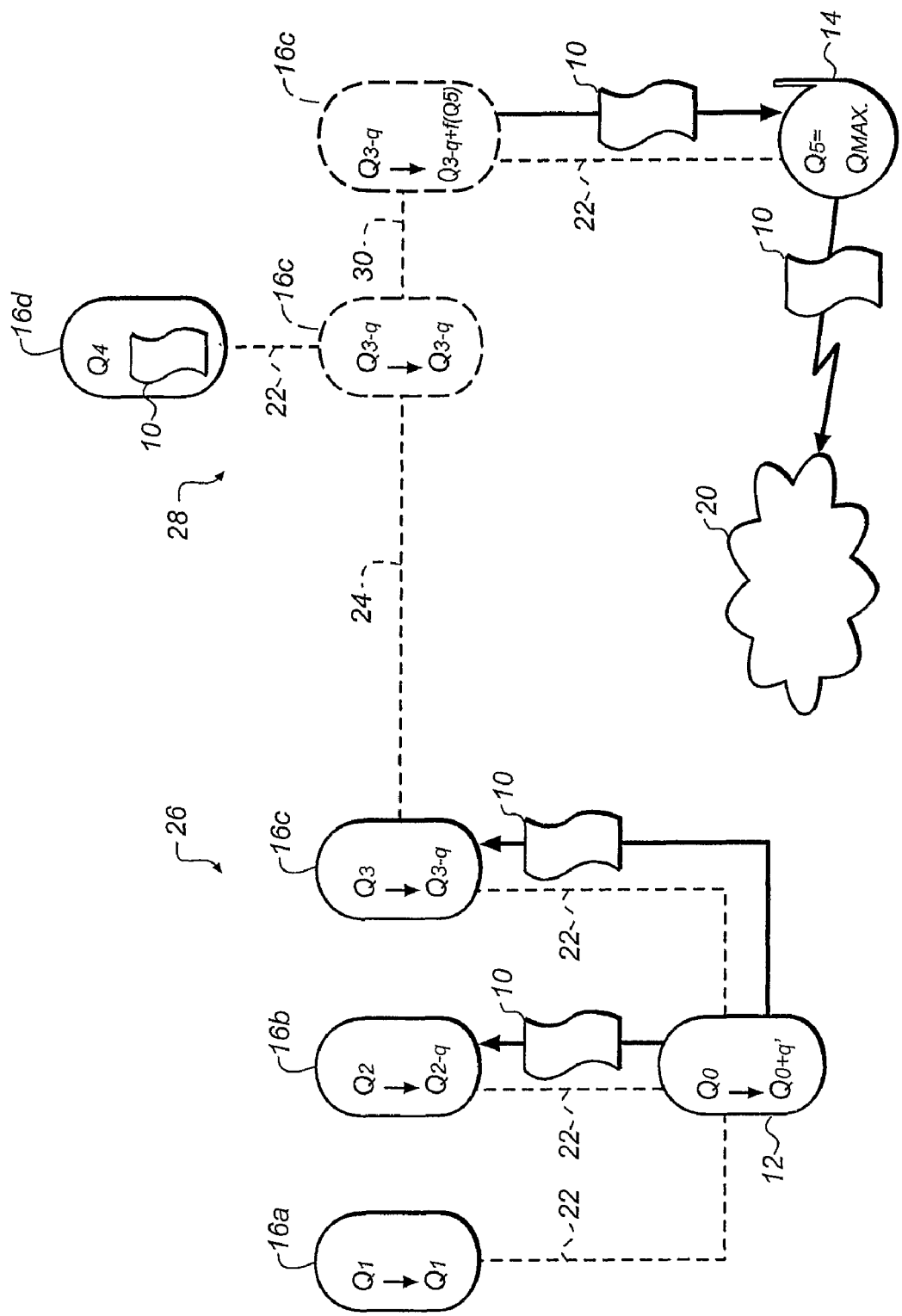
FIG. 1 is a schematic representation of the flow of data from source equipment to a collection terminal using a method according to the invention.

FIG. 1 illustrates the transmission of a data set 10 from source equipment 12 to a collection terminal 14 by means of mobile equipments 16a, 16b, 16c, 16d capable of forming an ad-hoc network. For simplification purposes only a very small number of equipments is represented. However, the method can involve a large number of equipments.

Before further examining the features of the ad-hoc network, it is advisable to remember that the purpose of the transmission of the data set 10 by the ad-hoc network is to enable the source equipment to forward the data to a data processing center, either directly, or by means of a distributed network 20, whereas the source equipment has no communication access, or, at least, does not have preferred communication access to the processing center or to the distributed network. The distributed network 20 is, for example, a public or private telephone network, or the Internet.

The collection terminal is, for example, a communication terminal of a photographic proofs supplier. The terminal is capable of receiving data corresponding to digital images, in order to print photographic proofs and forward them to an addressee. The collection terminal can also be mobile or fixed communication equipment, having privileged access to the distributed network. This is, for example a computer having unlimited or fixed access to the Internet.

On FIG. 1, the source mobile equipment 12 is considered to be the one that generated a set of digital data 10. The data set is, for example, one or several photographic images. However, the process described here would not be any different if the equipment 12 was not the source equipment, having generated the data, but relay equipment having received the data from other equipment, not shown. The source equipment establishes broadband proximity communication with peer equipment found in its neighborhood. Peer equipment is equipment capable of exchanging information with the source equipment according to a common communication protocol. The exchanges are made by radio or infrared channels, for example.

In the situation illustrated by FIG. 1, the source equipment is, at a given moment, in proximate communication with three mobile peer equipments capable of being selected as relay equipment. A communication relationship indicated by a broken line 22 is established with each of these equipments so as to proceed to an identification and assessment of the capacity of each peer equipment to route data to a collection terminal.

This first communication relationship can comprise the exchange of information such as the memory capacity, the power reserve and the quality factor of each equipment. Although the quality factor can include information on the reserve power, free memory, etc. as parameters, it is mainly based on the data transmission history of each equipment. This aspect has been described above. One assumes that three mobile equipments 16a, 16b, 16c, in relationship with the source equipment 12 have quality factors noted Q1, Q2 and Q3 respectively. It is further assumed that Q2 and Q3 are higher than Q1.

The source equipment 12 selects two mobile equipments 16b and 16c from among three mobile equipments of its neighborhood as relay equipment. The selection retains for example the equipment whose quality factors are the highest, or whose quality factors are higher than the quality factor Q0 of the source equipment. The data set 10 is communicated to each of the selected relay equipment. These store it temporarily in memory. The quality factor of relay equipment having received the data set is decreased by an amount q, whereas that of the source equipment is increased by a quantity q'. The quantities q and q' can be the same or different, fixed or not. The quantities q and q' can be determined in particular as the functions of equipment having received or transmitted the data set. This gives q=f(Q0) and q'=f(Q2, Q3), for example.

A dotted line 24 indicates a physical movement of one of the mobile relay equipments 16c having received the data set 10. The physical movement is due, for example, to the movement of the user of the mobile equipment 16c in question. During this movement, the mobile equipment 16c leaves a zone 26 in which a communication relationship with the source equipment 12 was possible and reaches another zone 28 in which a new communication relationship 22 with new mobile equipment 16d is established. The relay equipment 16b is shown by a dotted line in the new zone 28. It is found in this new zone 28 a moment later than when it was in the previous zone 26.

It may be seen that the mobile equipment 16d-present in the new zone 28 already contains in its memory a data set 10 identical to the one the mobile relay equipment 16c carries. The already present data set 10 comes, for example, from mobile equipment, not shown in FIG. 1, which received the data set from the source equipment and which transmitted it, directly or by successive hops, to the mobile equipment 16d present in the new zone, before the relay equipment 16c could establish a communication relationship with the latter. Thus, and despite a possible quality factor Q4 which might be higher than Q3−q, no new transmission of the data set from the relay equipment 16c to the new mobile equipment 16d takes place. This prevents redundancy of the data in the equipment memory.

At the end of a new movement 30 of the mobile relay equipment 16c, this enters a zone of local communication with the collection terminal 14. After a communication relationship 22 is established the data set is transmitted to the terminal. Here one assumes that the terminal had not previously received the same data set from other mobile relay equipment.

Then, the data set can be handled by data processing equipment, such as a printer, linked to the collection terminal. He can also be transmitted to a selected addressee, by means of the distributed network 20 to which the collection terminal has a privileged connection.

The quality factor of the relay equipment 16c is increased by a quantity f(Q5) which depends on the quality factor of the collection terminal and becomes Q3−q+f(Q5). The value Q5 here equals the maximum value that mobile equipment could reach that would definitely transmit all the messages received to collection terminals. The quality factor of the collection terminal is not modified, but is maintained at the maximal value.

Figure 2:
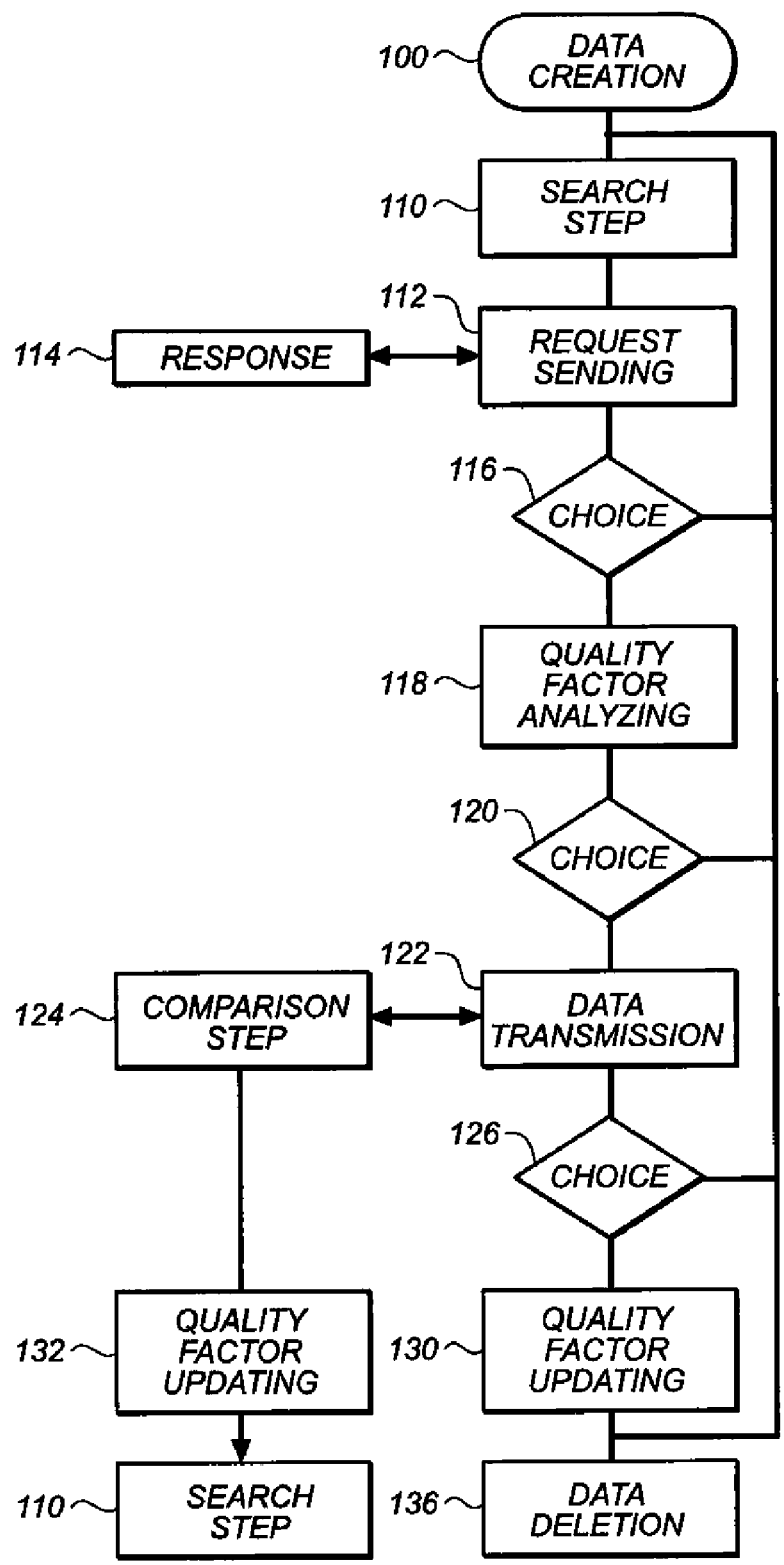
FIG. 2 is a flowchart illustrating a possible implementation of a method according to the invention by mobile communication equipment.

One possibility of data exchange between mobile equipment is illustrated by the flowchart of FIG. 2 whose left part corresponds to equipment capable of receiving a data set and whose right part corresponds to equipment capable of transmitting a data set. To distinguish them, and by simplification, peer equipment is simply described as transmitting equipment and receiving equipment in the following text.

A first step, shown by the reference 100, is not properly part of the data transmission process. This is the creation of a data set by mobile equipment or the reception of the data set from other equipment. For example, step 100 could be the capture of a digital photograph and the forming of a data set such as an image file. The transmission process thus comprises an initial search step 110, in the local communication environment, for equipment enabling interaction according to a common exchange protocol. Such a step is common to all proximity exchanges between peer equipment. The exchange protocols are for example of the type of the exchanges via a Bluetooth peer-to-peer network or a network based on Wi-Fi/IP.

A next step 112 comprises the sending of a request to the receiving equipment to invite the receiving equipment to communicate its quality factor, and possibly other information useful for a possible transmission of the data set. The receiving equipment makes a response 114 and sends the information, as well as the value of its quality factor, to the transmitting equipment.

Reference 116 shows a choice step between on the one hand, the continuation of communication when receiving equipment is identified and when this has supplied a response to the request, and, on the other hand, the later renewal of the search for mobile equipment in the communication environment. In the latter case, the process then returns to the initial step 110.

When one or several responses reach the transmitting equipment, the next step 118 consists in analyzing the quality factors of the receiving equipment. The analysis can in particular comprise the mutual comparison of quality factors, to determine from among the receiving equipments those that have the highest quality factors, and thus the highest probability of routing the data set quickly to a collection terminal. The analysis can also comprise comparison of the quality factors of the receiving equipment with that of the transmitting equipment. This enables, for example, transmission of the data set only to relay equipment that has a higher probability of routing the data than the transmitting equipment. The analysis is followed by the selection of receiving equipment capable of receiving the data set as relay equipment. The selection is made in particular on the basis of the previous comparison of the quality factors.

A new choice step 120 enables either the process to be continued when receiving equipment has been selected, or new mobile equipment in the environment of the transmitting equipment to be searched for. In the latter case, the process again returns to the initial step 110. The selection criteria of receiving equipment that is to act as relay can be moderated with each new resumption of the process following a fruitless selection step 118.

If a favorable decision is made to continue the process, this is continued by a step 122 of transmission of the data set from the transmitting equipment to the receiving equipment. The receiving equipment performs a comparison step 124 of the data received with the data already present in its memory. At the end of this step it returns an acceptance message to the transmitting equipment, or a refusal message if it already had an identical data set. A refusal message can be also sent for a technical obstacle, such as, for example, insufficient memory capacity to store the data set. In fact, checking the existence or not of an identical data set in the internal memory of the receiving equipment can also be performed on the basis of part of the data or on the basis of identification data of the data set. In this case, the complete data set is sent only in case of acceptance. The same applies with checking the memory capacity.

A new choice step 126 enables either the process to be continued, when the data set is accepted by the receiving equipment, or the initial step 110 to be resumed, i.e. the search for other mobile equipment capable of acting as relay.

The next step is shown by reference 130 for the transmitting equipment and by reference 132 for the receiving equipment. This is the updating of the respective quality factors. The quality factor of the receiving equipment is decreased, by a quantity that, in the present example, is here selected as fixed. The quality factor of the transmitting equipment is increased by a quantity depending on the quality factor of the receiving equipment. When other transmissions of the data set are planned, the transmitting equipment then resumes the initial search step 110.

At the end of the exchange, the receiving equipment becomes, in its turn, transmitting equipment and begins the step 110 of searching for peer mobile equipment or for collection terminals in its environment. If the receiving equipment is a collection terminal, the process is finished.

The last step of the transmitting equipment, shown by reference 136, comprises the deletion of the data set after a set storage period. The length of the period may be modulated according to the number of resident data sets and/or the number of peer mobile equipments with which the transmitting equipment enters into communication.

It should be understood that the order of the process steps described with reference to FIG. 2 is not determining. Certain steps can be performed concurrently or in a different order. For example, the updating of the quality factor can be performed even before data transmission and separately from this transmission. This can be the case in particular when the receiving equipment receives new data sets before the transmission of already received data sets. Transmission of the data set can also be performed as from the first exchange, i.e. without a prior check that the data set has not already been received, at the risk of a later refusal.

Figure 3:
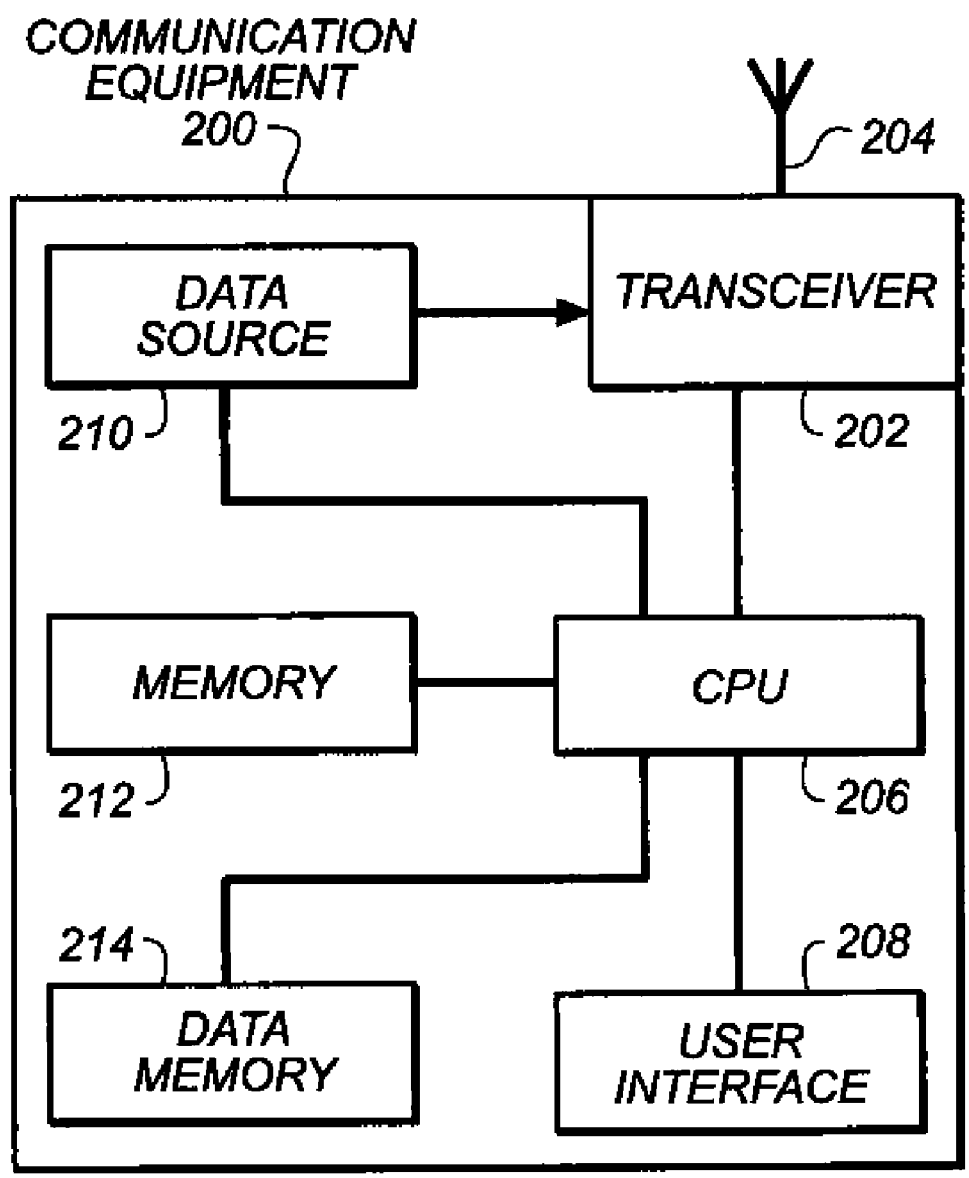
FIG. 3 is a schematic representation of mobile communication equipment according to the invention.

FIG. 3 very briefly illustrates the main characteristics of communication equipment 200 comparable to the equipment 16 mentioned with reference to FIG. 1. The equipment 200 comprises a transceiver 202 capable of transmitting information and receiving information from other mobile or fixed equipment. The exchange is carried out for example by radio channel, as an antenna 204 shows symbolically. A CPU 206 controls the transmitter to transmit or receive data sets from a user interface 208 or from a data source 210 dedicated to a function or a memory 214. The data source 210 is for example an image or sound sensor.

The CPU 206 works together with a memory 212 for storing one or several quality factors of the mobile equipment, to constitute a means of updating one or several quality factors, according to the communication history. The updating is performed, for example, with each transmission or with each reception of a data set. The CPU 206 also works together with the transceiver to constitute a means intended to collect the quality factors from other mobile equipment with which the equipment 200 is in communication. The CPU can thus, by comparing the quality factors, select the equipment or equipments to which a data set will be transmitted. Finally, the memory 214 is planned to temporarily store the received data sets for transmission to a collection terminal. The data can result from other equipment, from the user interface 208 or from the data source 210. Furthermore, a common memory can constitute the memories 212 and 214 distinguished here for clarity purposes.

Cited Documents
1) WO 03/090365
2) WO 2004/043088
3) US 2004/0085909
4) US 2003/0202476
5) US 2004/0081166
6) US 2003/0224799
7) U.S. Pat. No. 5,943,322

The invention claimed is:

1. Method of data transmission comprising:
a mobile sending device searching for relay equipment and receiving devices in a field of local radio coverage;
collecting quality factors associated with the relay equipment and the receiving devices responding to the searching;
transmitting data from the mobile sending device to at least one receiving device via relay equipment;
updating at least one quality factor associated with the the receiving devices and the relay equipment, the quality factor being based upon a history of data transmission; and
transmitting data from the mobile sending device to a receiving device via relay equipment, wherein the data transmission from the mobile sending device to the relay equipment is conditioned based on the quality factors associated with the relay equipment capable of receiving the data, such that the data is preferentially transferred to the relay equipment in a decreasing order of the quality factors associated with the relay equipment, or such that the data is transfered to at least one relay equipment having a higher quality factor than a threshold quality factor and having a quality factor higher than a quality factor associated with the sending device.

2. The method according to claim 1, further comprising the step of:
updating the quality factor of each relay equipment during a reception and transmission of the data by said relay equipment.

3. The method according to claim 2, further comprising the steps of:
increasing the quality factor during a transfer of data received from other mobile equipment; and
decreasing the quality factor in an absence of the transfer of received data to at least one from among other mobile devices at an end of a preset storage period.

4. The method according to claim 2, further comprising the steps of:
increasing the quality factor during the transfer of data to at least one from among other mobile devices; and
decreasing the quality factor during a reception of data from other mobile equipment.

5. The method according to claim 2, further comprising the step of:
increasing the quality factor during the transfer of data to other mobile devices by a quantity that depends on a quality factor of said other mobile devices.

6. The method according to claim 5, wherein the quality factor Q of mobile equipment is such that:

$$Q = \frac{<Qi>}{N}$$

where Qi is a quality factor of receiving mobile devices to which the data are transferred, N is a value incremented at each reception of data to transfer from transmitting mobile devices, and where <Qi> is an arithmetic mean of a plurality of Qi values.

7. The method according to claim 6, further comprising the step of:
updating the value of the quality factor with a new value corresponding to a maximum value of the quality factor capable of being reached by the mobile equipment for each data transfer to a receiving device.

8. The method according to claim 1, further comprising the step of:
limiting a number of hops between mobile relay equipment.

9. The method according to claim 1, further comprising the steps of:
limiting a number of hops according to the quality factor of the sending device from which the data is transmitted for the first time; and
decreasing the number of hops by one at each transmission to new mobile relay equipment.

10. The method according to claim 1, further comprising the steps of:
decreasing a threshold quality factor in the absence of responses sufficient in number to the step of searching for relay equipment; and
repeating the step of searching.

11. The method according to claim 1 further comprising the step of:
transferring the data to a number E of relay equipments according to their quality factors and having responded to the step of searching.

12. The method according to claim 11, further comprising the step of:
verifying that each data to be transferred from a sending device to a receiving device satisfies $E^H=k$, where k is a preset constant and H is a maximum number of hops between relay equipment.

13. A method of transmission of data from at least one source equipment to at least one collection terminal, wherein the data is transmitted via mobile communication relay equipment in an ad-hoc network, the mobile communication relay equipment adapted to be carried by users who can physically move, the mobile communication relay equipment having a memory in which the data is temporarily stored until transmission of the data to a next mobile communication relay equipment or a collection terminal, wherein each mobile communication relay equipment has an associated quality factor determined based on a transmission history of past data transmissions, and wherein the quality factor is respectively decreased upon reception of data to be transmitted by the mobile communication relay equipment and the quality factor is respectively increased upon transmission of the data to be transmitted by the mobile communication relay equipment to the next mobile communication relay equipment or the collection terminal, and wherein the transmission of the data to the next mobile communication relay equipment is conditional on the quality factor of the said next mobile communication relay equipment.

* * * * *

UNITED STATES PATENT AND TRADEMARK OFFICE
CERTIFICATE OF CORRECTION

PATENT NO. : 8,014,350 B2  
APPLICATION NO. : 11/816415  
DATED : September 6, 2011  
INVENTOR(S) : Nicolas Patrice Bernard Touchard et al.

Page 1 of 1

It is certified that error appears in the above-identified patent and that said Letters Patent is hereby corrected as shown below:

Issued Patent

| Column | Line | Description of Error |
|---|---|---|
| 11 | 32-33 | In Claim 8, delete "equipment." and insert -- equipment according to the quality factor of the sending device. -- |

Signed and Sealed this  
Sixth Day of December, 2011

David J. Kappos  
*Director of the United States Patent and Trademark Office*